United States Patent
Suman Reddy et al.

(10) Patent No.: US 12,014,512 B2
(45) Date of Patent: Jun. 18, 2024

(54) SYSTEM ADAPTED TO DETECT ROAD CONDITION IN A VEHICLE AND A METHOD THEREOF

(71) Applicants: Robert Bosch GmbH, Stuttgart (DE); Robert Bosch Engineering and Business Solutions Private Limited, Karnataka (IN)

(72) Inventors: Calagandhra Harinath Suman Reddy, Tirupati (IN); Hegde Anand Ashok, Bangalore (IN); Nemani Rama Aditya, Bangalore (IN); Sathish Kumar Jayaraj, Bangalore (IN)

(73) Assignee: Robert Bosch GmbH, Stuttgart (DE)

( * ) Notice: Subject to any disclaimer, the term of this patent is extended or adjusted under 35 U.S.C. 154(b) by 4 days.

(21) Appl. No.: 17/863,087

(22) Filed: Jul. 12, 2022

(65) Prior Publication Data

US 2023/0046137 A1     Feb. 16, 2023

(30) Foreign Application Priority Data

Jul. 19, 2021   (IN) .............................. 202141032310

(51) Int. Cl.
*G06T 7/62* (2017.01)
*G06T 7/60* (2017.01)

(52) U.S. Cl.
CPC ...... *G06T 7/60* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 2006/0104481 A1 | 5/2006 | Demro et al. | |
| 2015/0203023 A1* | 7/2015 | Marti | B60W 50/14 340/425.5 |
| 2017/0261315 A1* | 9/2017 | Yamaguchi | G08G 1/16 |
| 2021/0009137 A1* | 1/2021 | Herman | B60W 30/146 |
| 2021/0157330 A1* | 5/2021 | Tran | G06V 10/82 |
| 2021/0264169 A1* | 8/2021 | Speigle | G06V 20/588 |
| 2022/0105869 A1* | 4/2022 | Pryke | G06T 7/60 |

* cited by examiner

*Primary Examiner* — Samuel D Fereja
(74) *Attorney, Agent, or Firm* — Maginot, Moore & Beck LLP

(57) ABSTRACT

A system adapted to detect road condition in a vehicle and a method thereof uses geometrical laser projections and an image processing system. The system includes a laser source, an imaging unit and at least a processing unit. The laser source is adapted to project geometrical laser projections on the road. The imaging unit is adapted to capture images of the geometrical projections. The processing unit is configured to calculate a surface reflectance for the projected geometrical projection. Further it is configured to compute geometrical parameters of the projections at regular time intervals based on the captured images. It determines a road condition based on the surface reflectance and the geometrical parameters.

11 Claims, 4 Drawing Sheets

SYSTEM ADAPTED TO DETECT ROAD CONDITION IN A VEHICLE AND A METHOD THEREOF

This application claims priority under 35 U.S.C. § 119 to patent application no. IN 202141032310, filed on Jul. 19, 2021 in India, the disclosure of which is incorporated herein by reference in its entirety.

FIELD OF THE DISCLOSURE

The present disclosure relates to a system adapted to detect road condition in a vehicle and a method thereof. More specifically the disclosure describes a based method for detecting road condition such a road distress or an obstacle and the relevant hardware limitations thereof.

BACKGROUND OF THE DISCLOSURE

Automated vehicles or vehicle equipped with a certain level of driver assistance are required to anticipate road conditions correctly and react accordingly. The predictive road condition services help the system to detect hazards such as road distress, pothole or obstacles from a distance before a critical situation occurs. Many existing solutions provide the vehicle with real-time information about the environmental conditions and associated potential hazards such as aquaplaning, ice or snow using internet or cloud-based platforms. Certain other solutions use machine vision-based techniques, radar-based detection etc. Although these techniques help us identify most of the road conditions but ineffective in identifying road distress such as potholes and cracks. Further these techniques are expensive and difficult to assimilate in low cost vehicle. Hence there is a need for a cost-effective and accurate method to detect road distress from a moving vehicle.

Patent Application US2006104481 AA titled "Vehicle safety control system by image processing" discloses an image processing system adapted to image an area around a vehicle, comprising an image processor adapted to receive information indicative of an image of an area proximate to the vehicle automatically captured by an image capturing device, wherein the image processor includes logic to analyze the information indicative of the image proximate to the vehicle and automatically determine whether the information indicative of the image of an area proximate to the vehicle is indicative of at least one predetermined environment. In some embodiments, this image processing system is utilized for crash prevention and crash recording. In some embodiments, this image processing system is utilized to identify an increased likelihood of crash and/or the occurrence of a crash and/or to implement crash avoidance and/or crash safety devices.

BRIEF DESCRIPTION OF THE ACCOMPANYING DRAWINGS

An embodiment of the disclosure is described with reference to the following accompanying drawings.

DETAILED DESCRIPTION OF THE DRAWINGS

Figure 1:
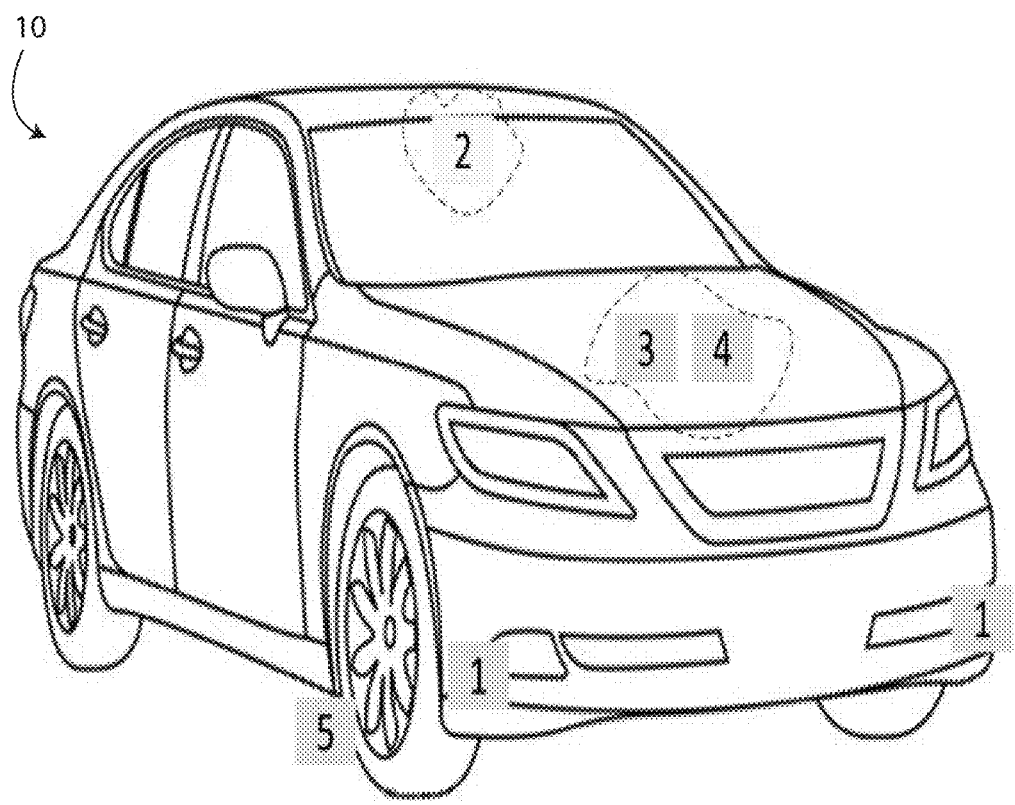
FIG. 1 depicts a system adapted to detect road condition in a vehicle (10)
Figure 2:
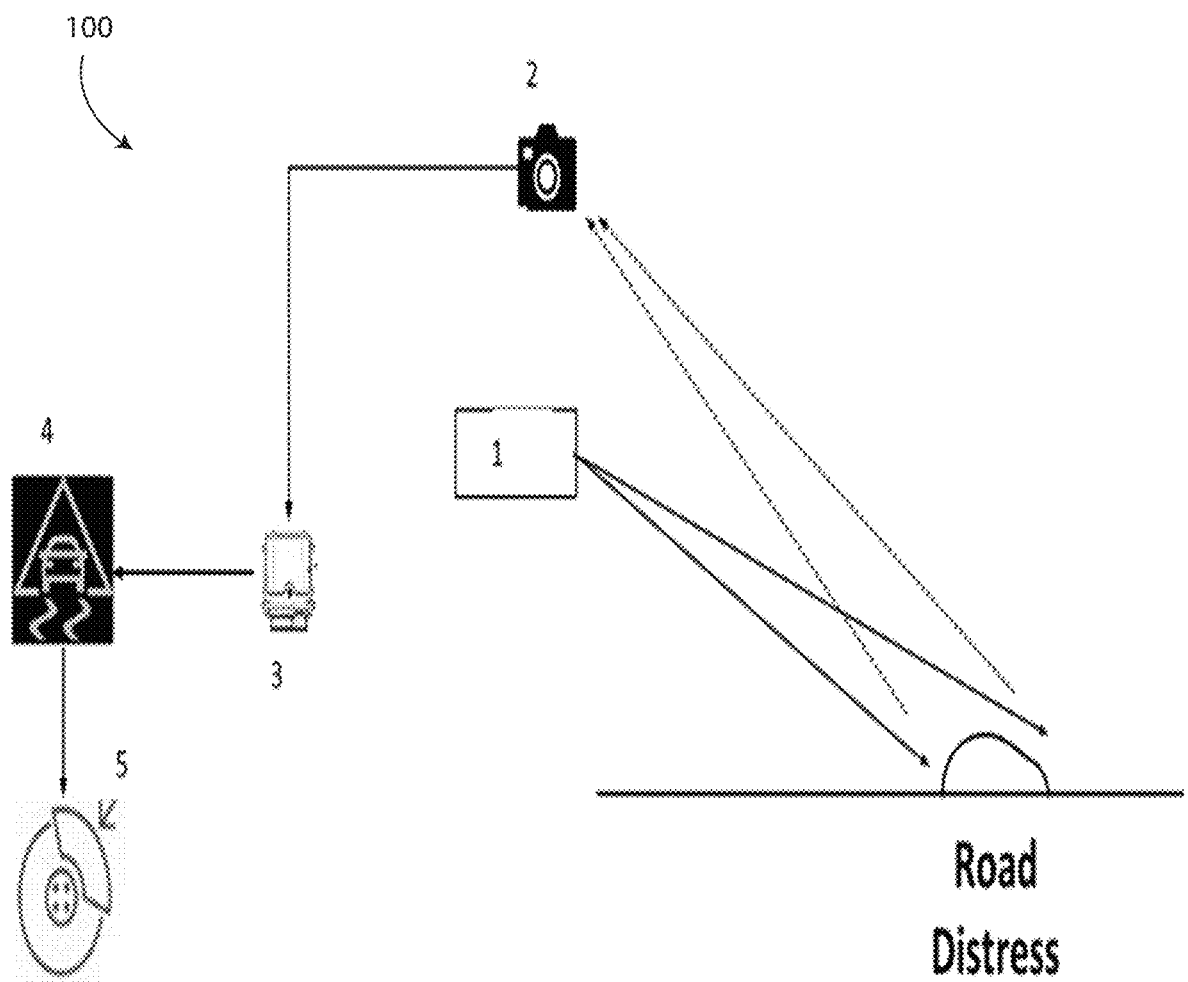
FIG. 2 depicts the components of the system (100) adapted to detect road condition in a vehicle.

FIG. 1 depicts a system adapted to detect road condition in a vehicle. The system resides in a vehicle as separate hardware limitations not restricted to the functions elaborated in this disclosure. However, in one embodiment of the disclosure the system is manifested in a device which is compatible or can be retrofitted in modern day vehicles. FIG. 2 depicts the components of the system adapted to detect road condition in a vehicle. The system comprises a laser source (1), an imaging unit (2) and at least a processing unit (3). In modern day vehicles other independently working components such as the Electronic Braking modulator (4) module and the Braking System (5) module and also be configured to be coupled to the said system.

Figure 3:
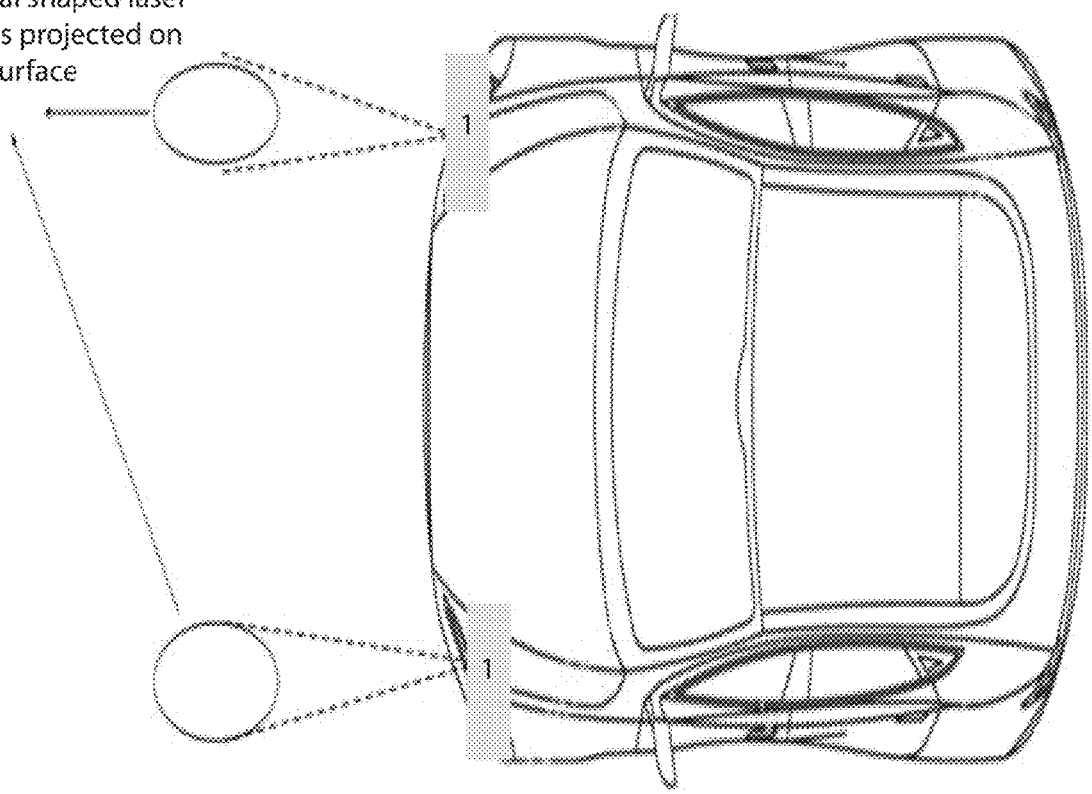
FIG. 3 illustrates geometrical laser projections emanating from laser source.

The laser source (1) is adapted to project geometrical laser projections on the road. The geometrical projections can be either of a polygon or an ellipse. FIG. 3 illustrates geometrical laser projections emanating from laser source. The geometrical laser projections are projected at a pre-defined minimum distance from the vehicle. This minimum distance corresponds to the braking distance required to bring a vehicle to a standstill based on the instantaneous speed of the vehicle. This distance is computed easily in accordance with well-known equations of motion in classical physics. Hence the laser source (1) is adapted to project the laser projections at varying distances according to the instantaneous speed of the vehicles. Further the laser source (1) in an exemplary embodiment also has diffractive optical elements that convert laser beam to a circle or elliptical projection.

The imaging unit (2) is adapted to capture images of the geometrical projections. For automotive imaging purpose, such cameras are commercially available and well known in the state of the art.

The processing unit (3) comprises a smart computing chip responsible for interpreting signals received by the processing unit (3) into meaningful information. Again, in an exemplary embodiment of the present disclosure, the processing unit (3) further comprises a specialized circuit that implements all the necessary control and arithmetic logic necessary to execute machine learning algorithms. The machine learning algorithms The processing unit (3) is configured to calculate a surface reflectance for the projected geometrical projection. Further it is configured to compute geometrical parameters of the projections at regular time intervals based on the captured images. It determines a road condition based on the surface reflectance and the geometrical parameters. Further the changing area of the projections in dependance of the other geometrical parameters determines the distance from the detected road condition.

Figure 4:
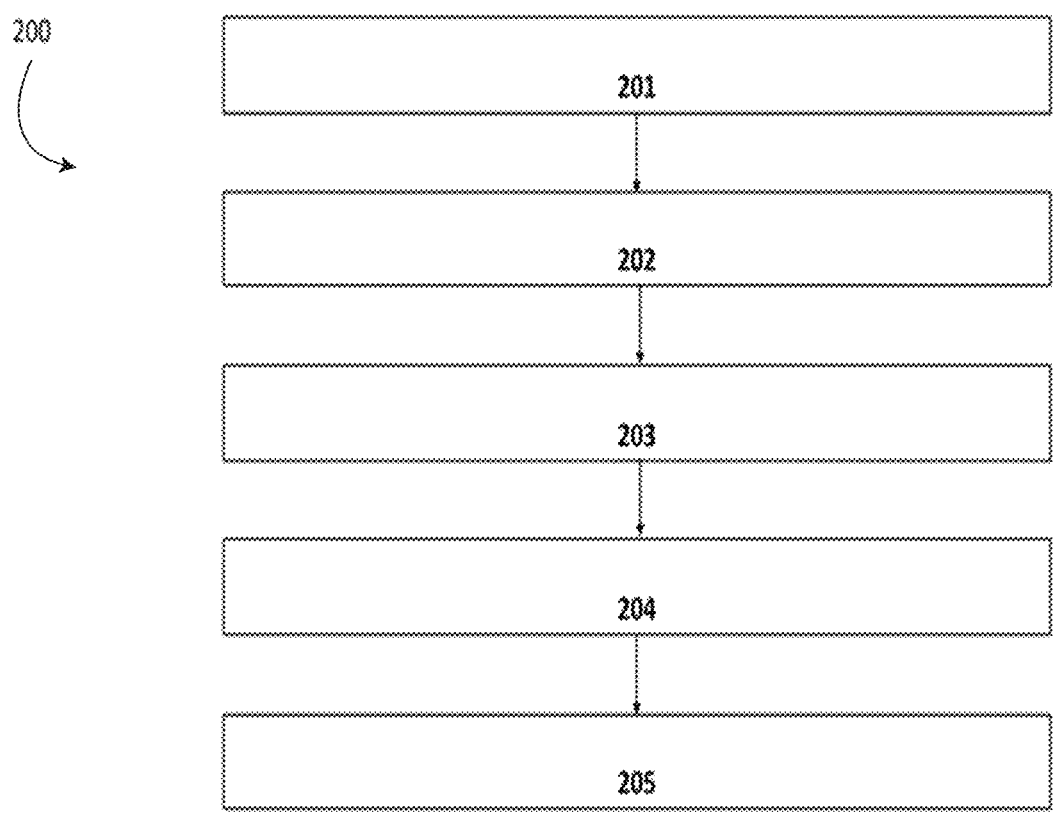
FIG. 4 illustrates method steps for detecting a road condition in a vehicle.

FIG. 4 illustrates method steps for detecting a road condition in a vehicle. The vehicle comprises a laser source (1), an imaging unit (2) and at least a processing unit (3) in accordance with the description of FIG. 1. In method step 201, a geometrical laser projection is projected on the road by means of the laser source (1). The geometrical projections can be either of a polygon or an ellipse. As discussed above said geometrical projections are projected at a predetermined distance (safe braking distance) based on instantaneous speed of the vehicle. In an embodiment this geometrical projection is an ellipse.

Step 202 comprises capturing images of the geometrical projections by means of the imaging unit (2). Further steps comprise processing captured images by means of the processing unit (3) using image processing techniques. In an embodiment the image processing techniques can be executed by means of machine learning models. Method step 203 comprises calculating a surface reflectance for the projected geometrical projection. Surface radiance or reflectance is defined as the ratio of reflected radiant flux (optical power) to the incident flux at a surface—for example, a road surface. It generally depends on the direction of incident light and on the optical frequency or wavelength. Surface reflectance calculation is done using mathematical model for diffuse reflection to estimate the reflectance of the surface such as the Lambertian model, Torrence-Sparrow model and the like. (Nayar, S.K., Ikeuchi, K. and Kanade, T., 1991. Surface reflection: physical and geometrical perspectives). In case of a road distress the surface reflectance will differ from that of a smooth road. Likewise, the surface radiance in case there is an obstacle of road for the projected geometrical projection will also differ from the smooth road condition.

Method step 204 comprises computing geometrical parameters of the projections at regular time intervals based on the captured images. Geometrical parameters comprise parameter such a perimeter, area and the like. In case of an elliptical projection the parameters further comprise Two Ellipse focal points, Ellipse Constants, Ellipse center, Eccentricity and the like. Method step 205 comprises determining a road condition based on the surface reflectance and the geometrical parameters. The changing area of the projections in dependance of the other geometrical parameters determines the distance from the detected road condition.

Fundamentally, the change in Ellipse (geometrical projection) and its properties coming from the laser projection on the surface of the road can be used as an input to understand the effect of the road distress conditions. Since the ellipse equation can be tweaked to mimic the wheel position on the road, it is the recommended geometrical projection to be used. Camera captures the images of the projected ellipse on the road. The output image is sent to the processing unit (3) that uses an image processing technique analyzes, for example a smoothness or distortion of the geometrical projection reflected from the image output. This assessment of the geometrical projection along with the surface reflectance gives us a road distress condition.

For example in case of a pothole, the geometrical projection will have a discontinuous circumference. Similarly the changing area of geometrical projection once a pothole is detected gives us the distance from the road distress. In order to reduce discomfort due to jerk or sudden braking, the distance from the road distress can be utilized to enforce a reactionary measure from the vehicle's Electronic Braking modulator (4) or an Braking System (5). The time taken by the aforementioned system to process and analyze the image, is not more than 100 milliseconds. While manually on average, the driver reaction time for road distress is 2.5 seconds. The minimum braking time needed to stop the vehicle with an initial velocity of 100 kmph=~2.5 seconds (as per the newtons equations of motion). Hence without the aforementioned system, 2.5 reaction time+2.5 braking time equals 5 seconds to decelerate the vehicle. However, by using the aforementioned system and methodology, we can cut down the minimum braking time to 2.5 seconds only.

This idea to develop a system adapted to detect road condition in a vehicle and a method thereof reduces reaction time for the driver for road distress conditions like pothole, road breaker, other obstacles. Further it is low cost and a high value-added function (VAF) for ESP system especially in Indian and other emerging markets.

It must be understood that the embodiments explained in the above detailed description are only illustrative and do not limit the scope of this disclosure. Any modification to a system adapted to detect road condition in a vehicle and a method thereof are envisaged and form a part of this disclosure. The scope of this disclosure is limited only by the claims.

We claim:

1. A system adapted to detect road condition in a vehicle, comprising:
   a laser source configured to project geometrical laser projections on the road;
   an imaging unit configured to capture images of the geometrical projections; and
   at least one processing unit configured to:
      calculate a surface reflectance for the projected geometrical projection;
      compute geometrical parameters of the projections at regular time intervals based on the captured images; and
      determine a road condition based on the surface reflectance and the geometrical parameters,
   wherein the surface reflectance is a ratio of reflected radiant flux to an incident flux at the road,
   wherein the geometrical projections include an ellipse,
   wherein the captured images include images of the projected ellipse as distorted by the road, and
   wherein the at least one processing unit is configured to determine the road condition by analyzing the distortion of the projected ellipse as included in the captured images.

2. The system adapted to detect road condition in a vehicle as claimed in claim 1, wherein a changing area of the projections in dependence of the other geometrical parameters and the surface reflectance determines a distance from the detected road condition.

3. The system adapted to detect road condition in a vehicle as claimed in claim 1, wherein:
   the laser source is configured to project the geometrical laser projections on the road at a pre-defined minimum distance from the vehicle, and
   the pre-defined minimum distance is based on a braking distance required to bring the vehicle to a standstill according to an instantaneous speed of the vehicle.

4. The system adapted to detect road condition in a vehicle as claimed in claim 1, wherein:
   the distortion of the projected ellipse has a discontinuous circumference, and
   the road condition is determined as a pothole.

5. The system adapted to detect road condition in a vehicle as claimed in claim 1, wherein the laser source is a first laser source, the system further comprising:
   a second laser source configured to project the geometrical laser projections on the road,
   wherein the geometrical projections of the first laser source include a first ellipse, and
   wherein the geometrical projections of the second laser source include a second ellipse.

6. The system adapted to detect road condition in a vehicle as claimed in claim 5, wherein the first ellipse and the second ellipse are projected simultaneously.

7. The system adapted to detect road condition in a vehicle as claimed in claim 5, wherein:
   the first ellipse is projected in front of a right side tire of the vehicle, and
   the second ellipse is projected in front of a left side tire of the vehicle.

8. A method to detect road condition in a vehicle, the vehicle comprising a laser source, an imaging unit and at least a processing unit, the method comprising:
- projecting geometrical laser projections on the road with the laser source;
- capturing images of the geometrical projections with the imaging unit;
- processing captured images with the at least one processing unit using the following steps:
  - calculating a surface reflectance for the projected geometrical projection;
  - computing geometrical parameters of the projections at regular time intervals based on the captured images; and
  - determining a road condition based on the surface reflectance and the geometrical parameters,
- wherein the surface reflectance is a ratio of reflected radiant flux to an incident flux at the road,
- wherein the geometrical projections include an ellipse,
- wherein the captured images include images of the projected ellipse as distorted by the road, and
- wherein the at least one processing unit is configured to determine the road condition by analyzing the distortion of the projected ellipse as included in the captured images.

9. The method to detect road condition in a vehicle as claimed in claim 8, wherein a changing area of the projections in dependence of the other geometrical parameters and the surface reflectance determines a distance from the detected road condition.

10. The method to detect road condition in a vehicle as claimed in claim 8, wherein:
- the distortion of the projected ellipse has a discontinuous circumference, and
- the road condition is determined as a pothole.

11. The method to detect road condition in a vehicle as claimed in claim 8, wherein:
- projecting the geometrical laser projections on the road at a pre-defined minimum distance from the vehicle using the laser source; and
- determining the pre-defined minimum distance based on a braking distance required to bring the vehicle to a standstill according to an instantaneous speed of the vehicle.

* * * * *